May 4, 1965      W. R. HIRE      3,181,676
COLLAPSIBLE CONVEYOR

Filed Oct. 29, 1962      2 Sheets-Sheet 1

INVENTOR
William R. Hire
By Anthony D. Cennamo
ATTORNEY

May 4, 1965 W. R. HIRE 3,181,676
COLLAPSIBLE CONVEYOR
Filed Oct. 29, 1962 2 Sheets-Sheet 2

INVENTOR
William R. Hire
By Anthony D. Cennamo
ATTORNEY

3,181,676
COLLAPSIBLE CONVEYOR
William R. Hire, Newark, Ohio, assignor, by direct and mesne assignments, to Research Manufacturing, Inc., Newark, Ohio, a corporation of Ohio
Filed Oct. 29, 1962, Ser. No. 233,958
3 Claims. (Cl. 193—35)

This invention relates generally to conveyors for the transportation of articles and relates specifically to a conveyor that is adjusted to be folded or collapsed into a compact package for portability.

Conveyors utilizing elongated rollers or rollers of roller skate type have been used very extensively for many years for the transportation of articles. Conveyors in use in industry form a permanent installation at their point of utility, or of semi-permanent installation by the shifting of sections. These latter sections, although portable, are ten feet or longer and consequently, because of their bulkiness, movability is restricted. Further, the cumbersome sections always require extensive storage area when not in use.

The present invention overcomes these noted disadvantages by providing a conveyor that is truly compactable into a small package, thereby readily permitting portability from one position to another. Further, through its compactness, the storage problem of the conveyor system is greatly reduced. But of even more significance, the collapsing of the conveyor of the present invention has not been with a sacrifice in rigidity or its mechanical strength. Very generally, the preferred embodiment comprises a plurality of hingedly connected sections. These sections are comparatively small and are so arranged to be folded or collapsed into a compact package or extended into a straight and rigid order for use.

It is accordingly a principal object of the present invention to provide a new and improved conveyor that is portable, structurally simple, and yet mechanically efficient.

A further object of the present invention is to provide a new and improved conveyor that may be readily collapsed into a compact package for storage or transportation from place to place.

Another object of this invention is to provide a collapsible conveyor that has not sacrificed mechanical ruggedness required by industrial users and consequently provide a conveyor that may be extended from a collapsed package into a straight rigid structure.

Other objects and features of the present invention will become apparent from the following detailed description when taken in conjunction with the following drawings, in which.

Figure 11:
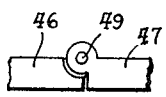

FIG. 11 demonstrates a side view of an individual hinge leaf formed as an integral part of the side rail sections.

Figure 12:
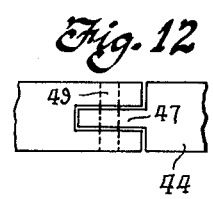

FIG. 12 demonstrates a top view of an individual hinge leaf formed as an integral part of the side rail sections.

In accordance with the general concepts of the present invention, a preferred embodiment comprises a conveyor composed of a plurality of identically-formed hingedly-connected sections. The successive sections are oppositely hinged to permit folding in an accordion manner. Each section of the conveyor further comprises a pair of opposed side rails and a plurality of spaced rollers or a roller section extending transversely between the side rails. The roller section is joined to the side rails in a manner that permits relative rotation of the side rails about their longitudinal axis. In this way the axis of the connecting hinges is positioned in a 90 degree relation to the longitudinal axis of the transverse rollers, thusly locking the side rails against folding or collapsing movement.

Figure 1:
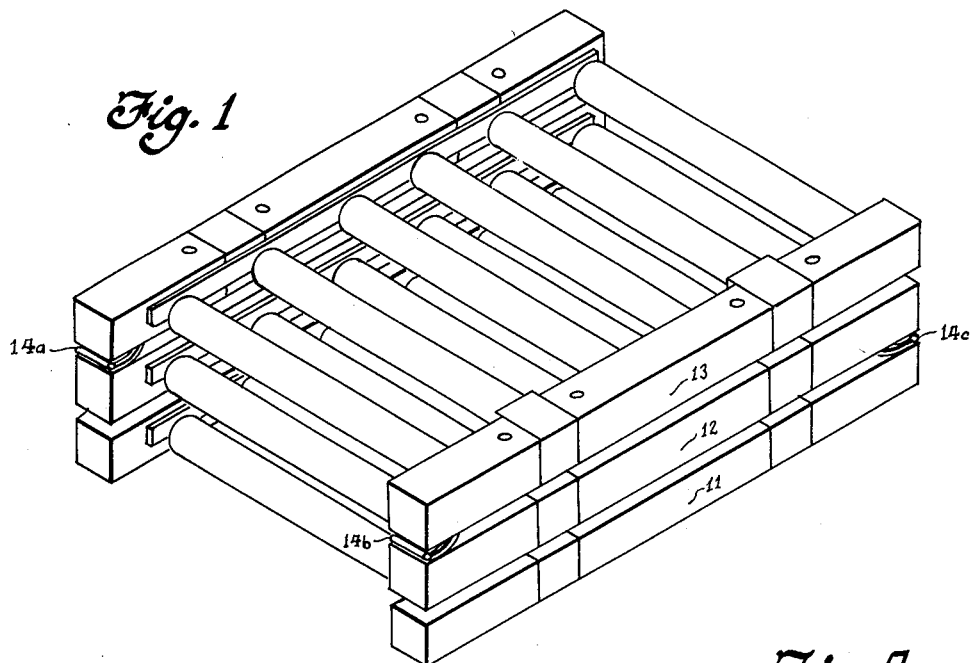
FIG. 1 is a perspective view of a conveyor formed in accordance with this invention and occupying a folded or collapsed position.

With reference to the drawing, the conveyor of this invention is shown as comprising a plurality of identical sections designated generally at 11, 12, and 13; the conveyor may include two or more sections as desired. The adjoining sections of the conveyor are connected together by sets of hinges 14a, 14b, 14c and 14n, with the individual sets of hinges located on opposite sides of the conveyor to permit folding in accordion style as shown in FIG. 1. In this way each of the sections lies flatly in superposed relation to the remaining sections. When unfolded into extended relation, the sections will all be in the same flat plane as shown in FIG. 2.

Each section of the conveyor comprises a pair of opposed, longitudinally extending side rails 15 and a transversely extending roller section 16. In FIGS. 1, 2, and 3, each side rail 15 of each section is composed of three separate but connected rectangular segments 15a, 15b, and 15c, and a six-roll roller section. The number of rolls in each section can be varied and the number of segments in each cooperating rail correspondingly varied. It will be noted that the outer ends of each roller section are sandwiched between adjacent ends of the rail segments. The rail segments of each conveyor section are connected together as hereinafter set forth for unified rotation relative to the rollers of that section. Furthermore, the adjacent ends 15a and 15c of the rails of each section of the conveyor are connected together by the hinges 14 so that when the sections are extended, as shown in FIG. 2, rotation of one segment of each side rail will cause simultaneous rotation of all remaining segments of the rail to that configuration shown in FIG. 3.

Figures 2, 3:
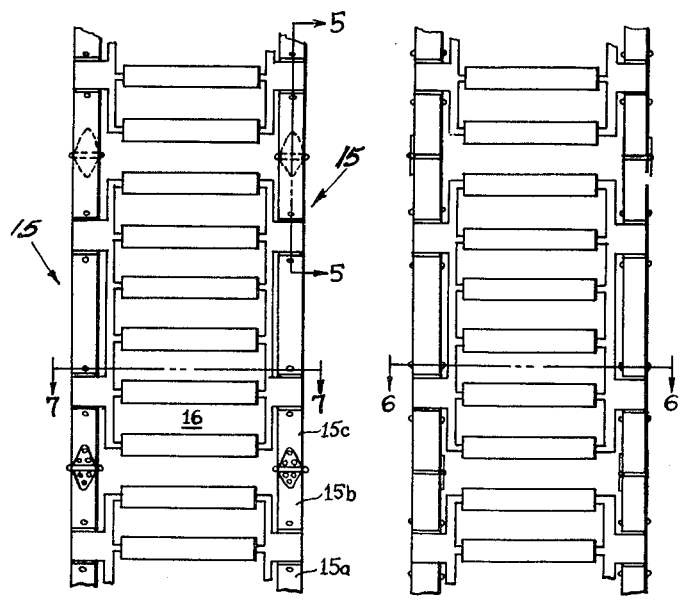
FIG. 2 is an elevational view of the conveyor in its initially extended condition and prior to the locking of the longitudinal side rail members.
FIG. 3 is an elevational view of the conveyor in its extended and locked condition.

As shown particularly in FIGS. 2 and 3, the individual sets of hinges 14 are mounted on opposite side surfaces of the side rails 15, so as to permit the conveyor sections to be folded in accordion style, as shown in FIG. 1. The axes or hinge pins of the individual hinges 14 are arranged in perpendicular relation to the longitudinal axes of the side rail forming segments, and the cooperative hinge plates may be screwed or otherwise rigidly fastened to the adjoining rail segment.

Assuming the conveyor to be in folded condition as shown in FIG. 1, it will be noted that it is a very compact unit. It is a simple matter to unfold it to the flat condition shown in FIG. 2, but it will be understood at this time, the individual sections of the conveyor will not be locked against relative folding movement.

To lock the conveyor to prevent collapsing or folding is a simple matter and involves the mere rotation or turning of each of the side rails 15 of the conveyor about their axes and through an angle of 90 degrees to the positions shown in FIG. 3. This 90 degree rotation of the side rails places the axes of the hinges of one side rail in parallel relation to the axes of the hinges of the opposite side rail and the axes of all hinges are then disposed in perpendicular relation to the longitudinal axes of the roller section 16. The individual side rails are preferably turned in opposite directions so that one set of hinges is located on the outside of the side rails while the other set is disposed on the inside of the rails. Thus, the conveyor will be rigidly braced against longitudinal folding by the hinges 14, and the roller section 16 will prevent relative lateral movement between the opposite side rails 15.

Figure 5:
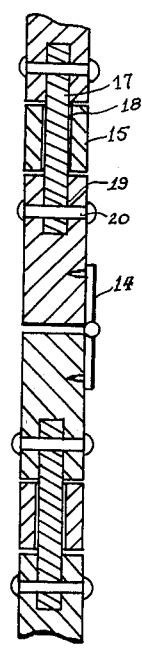
FIG. 5 is an enlarged fragmentary vertical sectional view taken along line 5—5 of FIG. 2.

As mentioned above, the adjacent rail segments on opposite sides of each roller section 16 are connected together for simultaneous rotation about a common longitudinal axis. This connection is made with reference to FIG. 5 by a longitudinally extending dowel pin 17 of circular cross-section which extends through an opening 18 formed in the roller section 16 and projects in opposite directions into sockets 19 formed in the adjacent ends of the rail segments. The dowel pins 17 are non-rotatively secured within the sockets 19 of the individual rail segments by means of transverse rivets or pins 20 which extend through the dowel pins and through the adjoining rail segments.

Figure 6:
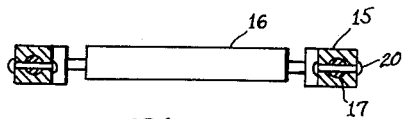
FIG. 6 is an enlarged horizontal sectional view taken along line 6—6 of FIG. 3.
Figure 7:
FIG. 7 is an enlarged horizontal sectional view taken along line 7—7 of FIG. 2.

The construction of the adjoining pivotal sections is illustrated in more detail in FIG. 6 and FIG. 7 showing cross-sectional views of the conveyor in its extended position of FIG. 2 and in its locked position of FIG. 3.

Figure 8:
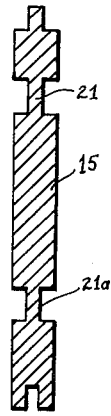
FIG. 8 is a vertical sectional view of a side rail component made of single piece construction from hinge to hinge.

With reference to FIG. 8, an alternative construction of the side rail 15 is shown. In this embodiment the dowels and pins are eliminated by the single piece construction. The side rail 15 has necked-down regions 21 and 21a forming cylindrical or dowel type areas in the region where the roller or the roller section is rotatively connected.

Figure 9:
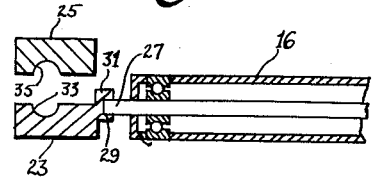
FIG. 9 is a fragmentary horizontal sectional view of the roller assembly, demonstrating sectional construction at the region of attachment to the side rail.
Figure 10:
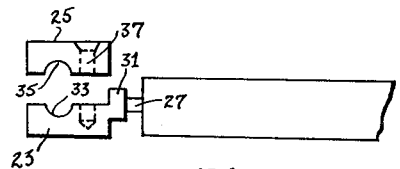
FIG. 10 is an alternative of the roller attachment from that shown in FIG. 9.

In the assembly of the rollers 16 with the single piece construction of FIG. 8, the roller end assembly may take the form of that shown in FIGS. 9 and 10. In this manner the rod 27 extending through the roller 16 rotatively fits into the aperture 29 in the end piece 31 of the lower block 23. The upper block 25 and the low block 23 each have a removed section 35 and 33 adapted to receive the necked-down portion 21 of the rail 16. The sections 25 and 23 may be permanently joined by the pin 37.

Figure 4:
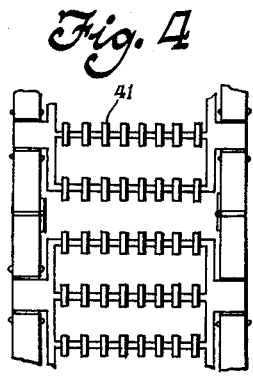
FIG. 4 is the conveyor of FIG. 3, but showing the alternative use of wheel instead of roller carrying surfaces.

The roller section may comprise a plurality of individual roller skate rollers 41 of FIG. 4 instead of the elongated roller.

In another alternative embodiment, the hinge 14 may be an integrally formed leave such as shown in FIGS. 11 and 12. In this embodiment the leaf 47 is integrally made a part of the rail 16 and pivotable through the pin 49 extending through apertures in the members 46 and 47.

Also, although the preferred embodiment is illustrated as being folded in an accordion manner, it is to be understood that the conveyor may be hinged to fold section over section or rolled. The manner of folding is one of expediency and may be accomplished by the proper arrangement of the hinges as related to the individual sections.

Although certain and specific embodiments have been shown, it is to be understood that modifications may be made without departing from the true spirit and scope of the invention.

What is claimed is:
1. A collapsible conveyor comprising at least a pair of side rails having a spacing therebetween and each composed of a plurality of separate, adjoining straight sections, each section further comprising a plurality of segments, dowel pin means non-rotatively securing said segments; hinge means permanently connecting said sections to one another for movement between a folded position and a longitudinally extended position, said hinge means having lineal hinge axes disposed in perpendicular relation to the longitudinal axes of said sections; a plurality of roller sections extending transversely between said side rails, each of said roller sections comprising a plurality of transverse rollers; a pair of end pieces on opposite ends of said rollers and adapted to rotatively receive said rollers, a joining block formed with each of said end pieces in integral relation to said dowel pins joining said segments to provide for axial turning movement of each of said side rails as a unit when the sections of side rails occupy their relatively longitudinally extended positions, said hinge means being turnable with said side rails to positions in which the hinge axes thereof are disposed in perpendicular relation to both the longitudinal axes of said side rails and the longitudinal axes of said roller members to thereby rigidly lock the adjoining side rail sections against relative folding movement.

2. A conveyor as set forth in claim 1 wherein said segments are formed by necking down said rail sections joining said segments and said joining block for said end pieces rotatively receives said necked down sections.

3. A conveyor as set forth in claim 1 wherein said plurality of transverse rollers are each a plurality of skate wheel rollers spaced thereacross.

References Cited by the Examiner
UNITED STATES PATENTS

| 2,923,391 | 2/60 | Hewitt | 193—35 |
| 3,081,840 | 3/63 | Hire | 182—163 |
| 3,081,857 | 3/63 | Krueger | 193—35 |

SAMUEL F. COLEMAN, *Acting Primary Examiner.*
WILLIAM B. LA BORDE, *Examiner.*